United States Patent [19]
Satou et al.

[11] Patent Number: 5,280,770
[45] Date of Patent: Jan. 25, 1994

[54] VARIABLE VALVE ACTUATION CONTROL SYSTEM

[75] Inventors: Ryuji Satou; Shunji Takahashi; Hiroshi Kitagawa, all of Saitama, Japan

[73] Assignee: Honda Giken Kogyo Kabushiki Kaisha

[21] Appl. No.: 46,113

[22] Filed: Apr. 9, 1993

Related U.S. Application Data

[63] Continuation of Ser. No. 903,686, Jun. 24, 1992, abandoned.

[30] Foreign Application Priority Data

Jun. 26, 1991 [JP] Japan ................. 3-180553

[51] Int. Cl.⁵ .............................................. F01L 1/34
[52] U.S. Cl. ............................. 123/90.15; 123/90.16
[58] Field of Search ................ 123/90.15, 90.16, 90.17

[56] References Cited

U.S. PATENT DOCUMENTS

| | | | |
|---|---|---|---|
| 4,535,732 | 8/1985 | Nakano et al. | 123/90.16 |
| 4,887,561 | 12/1989 | Kishi | 123/90.16 |
| 4,899,701 | 2/1990 | Inoue et al. | 123/90.16 |
| 4,917,057 | 4/1990 | Seki | 123/90.16 |
| 4,962,732 | 10/1990 | Inoue et al. | 123/90.16 |
| 5,009,203 | 4/1991 | Seki | 123/90.16 |
| 5,046,461 | 9/1991 | Kanehiro et al. | 123/90.16 |
| 5,143,031 | 9/1992 | Bruestle | 123/90.16 |

FOREIGN PATENT DOCUMENTS

| | | |
|---|---|---|
| 63-16111 | 1/1988 | Japan . |
| 2-42105 | 2/1990 | Japan . |
| 2-157440 | 6/1990 | Japan . |

*Primary Examiner*—E. Rollins Cross
*Assistant Examiner*—Weilun Lo
*Attorney, Agent, or Firm*—Skjerven, Morrill, MacPherson, Franklin & Friel

[57] ABSTRACT

In a control system for a valve actuation property variable control device which can switch over between a plurality of modes including a low speed mode for adapting at least one of an intake valve and an exhaust valve of an engine to a low speed range and a high speed mode for adapting the valve to a high speed range at least according to the rotational speed of the engine and a representative temperature of the engine, to prevent an abrupt change in the engine output by switching over valve actuating properties while the engine is being warmed up, the load condition of the engine is detected so that the transition from the low speed mode to the high speed mode may be prohibited if the representative temperature of the engine exceeds a prescribed level while a load higher than a prescribed level is being detected. Thereby, the driveability of the engine is improved.

7 Claims, 10 Drawing Sheets

VARIABLE VALVE ACTUATION CONTROL SYSTEM

This application is a continuation of application Ser. No. 07/903,686, filed Jun. 24, 1992, now abandoned.

TECHNICAL FIELD

The present invention relates to a variable valve actuation control system for internal combustion engines.

BACKGROUND OF THE INVENTION

To the end of achieving a large output in a high speed range and a large torque in a low speed range, a valve actuating device equipped with a variable valve actuation property control device for varying at least one of valve timing and a valve lift primarily according to a rotational speed of the engine is proposed, for instance, in Japanese patent laid open publication No. 63-16111. According to this proposal, a plurality of (for instance, two) valve actuating modes for different output torque properties are provided so that the range of the output property of the engine may be widened by selectively establishing one of the valve actuating modes which is suitable for each particular operating condition of the engine.

In an engine equipped with such a variable valve actuation property control device, it is preferable from the view point of the driveability of the vehicle equipped with the engine to avoid a sudden change in the engine output when switching over between a valve actuation mode suitable for low speed operation and another valve actuation mode suitable for high speed operation, and a technology is disclosed in Japanese patent laid open publication No. 02-042105 to switch over between the two modes when the outputs by the high speed mode and the low speed mode substantially agree with each other.

Meanwhile, if the switch over between two different valve actuation modes is carried out before the engine has been warmed up, unsatisfactory operation of the mechanism for valve actuation mode switch over may develop due to high viscosity of the lubricating oil which is used in the mechanism as a working fluid and irregular combustion resulting from unfavorable atomization of fuel under low intake temperature condition, and a control program is known which detects the warm-up of the engine as a condition for allowing the switch over between different valve actuation modes (refer to FIG. 7 of Japanese patent laid open publication No. 02-042105).

According to this control program, when the vehicle is operating in a range suitable for the high speed mode before the engine is warmed up, the low speed mode is selected until the completion of the warm-up of the engine is detected, and the transition from the low speed mode to the high speed mode occurs immediately after the detection of the engine warm-up. Therefore, particularly when the mode switch over is executed when the engine is warmed up under high load condition (with a large throttle opening), as there is a large difference in the engine output between the high speed mode and the low speed mode, a relatively large shock is expected to occur upon detection of the warm-up of the engine. As this is a change in the engine output which the operator of the vehicle may not be expecting, and substantially impairs the smooth impression of the vehicle, it should be avoided.

It has been proposed, for instance in Japanese patent laid open publication No. 02-157440, to control the slipping of driven wheels of an automobile by detecting the slip ratio of the driven wheels according to the deviation of the rotational speed of the driven wheels from that of the non-driven wheels, and reducing the output torque of the engine by making the air/fuel ratio of the engine intake leaner.

In mass produced engines, it is unavoidable to produce some variations in output properties because of inevitable manufacturing errors in the fuel injection valves and the camshafts and control errors in engine control. Therefore, the data stored in the engine control device serving as the basis for the control commands produced by the engine control device may deviate from the ideal data for engine control. In particular, the error in the air/fuel ratio in making the air/fuel ratio leaner for the purpose of traction control may cause a larger change in the actual engine output than what is considered to be acceptable.

In particular, when the valve actuation mode is to be switched over while such a traction control is being executed, the actual outputs of the high speed mode and the low speed mode may deviate from each other to such an extent that the high speed mode may actually give rise to a lower engine output than the low speed mode. In such a case, since the output torque of the engine is reduced when the valve actuation mode is changed from the low speed mode to the high speed mode, the slip ratio of the driven wheels is decreased upon the mode change, and the air/fuel ratio may be made richer or restored to a normal level so as to terminate the traction control. This in turn causes an increase in the output torque of the engine, and a corresponding increase in the slip ratio of the driven wheels, and produces a condition suitable for the resumption of the traction control, thereby creating an undesirable condition of hunting.

BRIEF SUMMARY OF THE INVENTION

This invention was made in view of such problems of the prior art, and its primary object is to provide an improved system for a variable valve actuation control which is free from a substantial change in the engine output when carrying out the switch over of the variable valve actuation control system.

A second object of the present invention is to provide a variable valve actuation control system which is simple in structure and can effectively eliminate a large change in the engine output when the engine is warmed up under a condition otherwise suitable for transition from one operating mode to another.

A third object of the present invention is to provide a variable valve actuation control system which is suitable for use in combination with the traction control of driven wheels based on the control of the air/fuel ratio of the engine intake.

The variable valve actuation control system, comprises: first detecting means for detecting at least a load condition of an engine, second detecting means for detecting a representative temperature of the engine; and control means for switching over an operating condition of a valve actuating mechanism for an intake valve and an exhaust valve of the engine from low speed mode suitable for a low speed range of the engine to a high speed mode suitable for a high speed range of the engine when said first detecting means has detected a load higher than a first prescribed load lever, and when said second detecting means has detected a temperature higher than a prescribed temperature level; further comprising: means for restricting transition from said low speed mode to said high speed mode when said second detecting means has detected a temperature exceeding said prescribed temperature level while said first detecting means has detected a load exceeding a second prescribed load level which is higher than said first prescribed load level.

According to this structure, if it is detected from the representative temperature of the engine that the engine has just been warmed up when the vehicle is operating in the low speed mode under a high load condition, a transition from the low speed mode to the high speed mode is prohibited, and an unexpected large change in the engine output is thereby avoided.

If the first detecting means has detected that the load condition of the engine has been sufficiently lowered, the prohibiting means may allow the transition from the low speed mode to the high speed mode without causing a large change in the output torque of the engine.

BRIEF DESCRIPTION OF THE DRAWINGS

Now the present invention is described in the following with reference to the appended drawings, in which.

DETAILED DESCRIPTION OF THE PREFERRED EMBODIMENTS

Now the present invention is described in the following with reference to the appended drawings.

Figure 1:
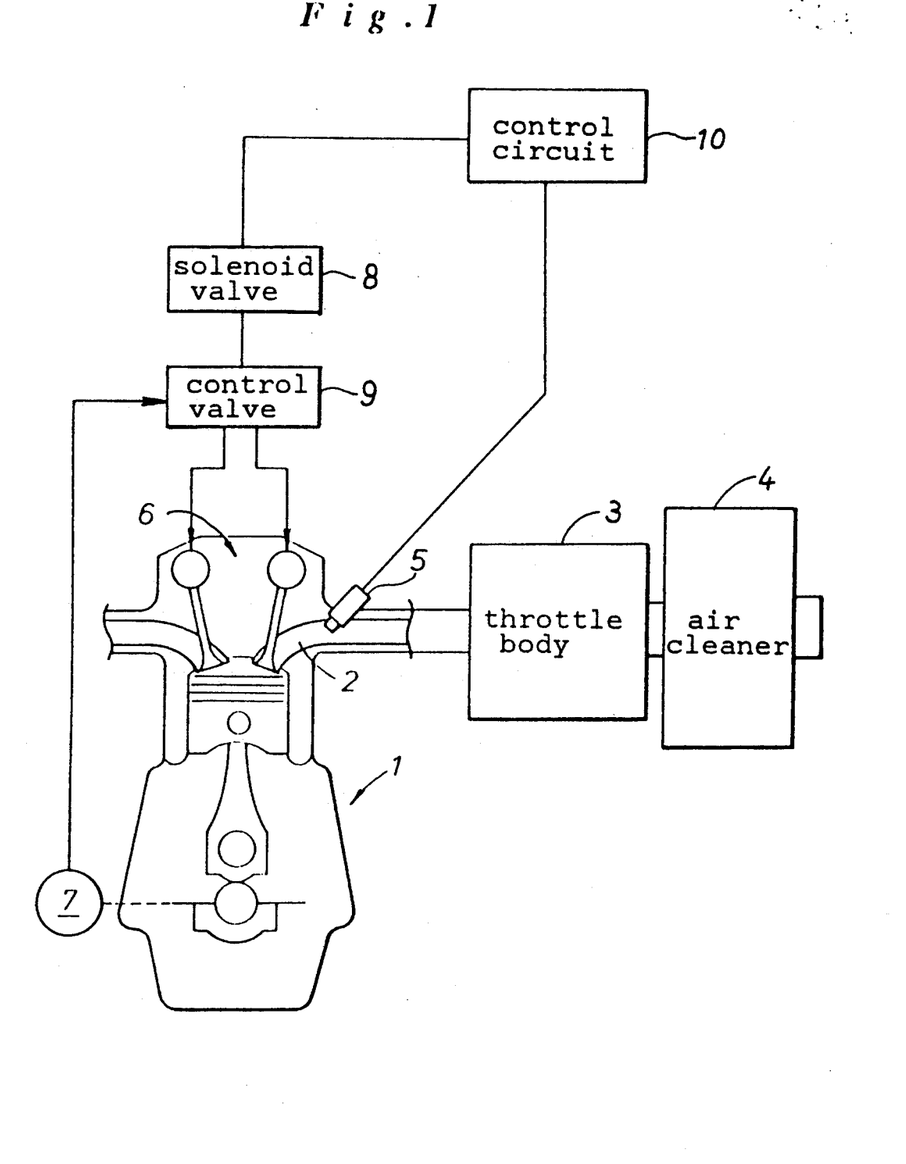
FIG. 1 is an overall and schematic structural view of an engine to which the present invention is applied.

FIG. 1 schematically illustrates the intake system of an engine to which the present invention is applied. An intake manifold 2 which is connected to the intake ports of the cylinders of an engine main body 1 which, for instance, may consist of a four-cylinder engine is provided with a throttle body 3 for controlling the flow rate of engine intake, and an air cleaner 4 for removing dust from the intake air, in a mutually serial relationship. A fuel injection valve 5 is provided adjacent each intake port of the engine for injecting fuel into the corresponding cylinder according to the amount of the intake air.

Meanwhile, a valve actuating device 6 for controlling the intake of mixture into the combustion chamber of each cylinder and the ejection of exhaust gas therefrom can vary the valve timing and the valve lift of the engine main body 1 in a step-wise manner by controlling the oil pressure produced by an oil pump 7 actuated by the engine main body 1 via a solenoid valve 8 and a switch over control valve 9. The solenoid valve 8 for varying the valve timing and the valve lift is controlled by an output signal from an electronic control circuit 10 along with the fuel injection valves 5.

Figure 3:
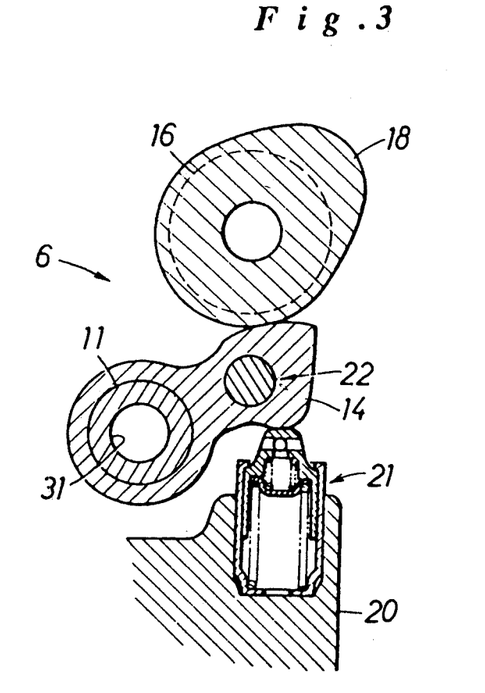
FIG. 3 is a sectional view showing a part of the valve actuating device shown in FIG. 2.
Figure 4:
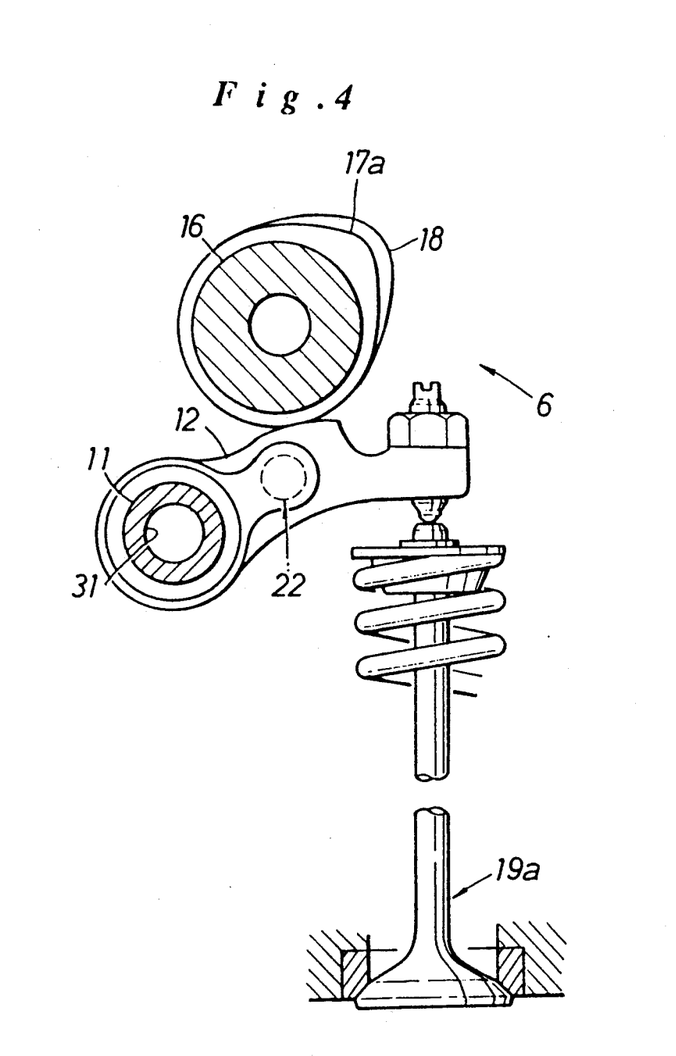
FIG. 4 is a fragmentary sectional view of an essential part of the valve actuating device shown in FIG. 2.

Now the valve actuating device 6 is described in the following with reference to FIGS. 2 through 4.

The engine to which the present invention is applied is a so-called DOHC engine in which the intake valves and the exhaust valves are actuated by separate camshafts, and each of the cylinders of this engine is provided with a pair of intake valves and a pair of exhaust valves. As these valves of two different kinds are basically provided with an identical structure, only the valve actuating device for an intake valve is described in the following disclosure.

A rocker shaft 11 fixedly secured to a cylinder head supports three rocker arms 12, 13 and 14 for each cylinder in individually rotatable manner one next to the other. A camshaft 16 is rotatably supported above the rocker arms 12, 13 and 14 by cam shaft bearings 15 formed in the cylinder head. The camshaft 16 is integrally provided with a pair of low speed cams 17a and 17b for a relatively small actuation angle and lift, and a single high speed cam 18 for a relatively large actuation angle and lift. Free ends of the first and second rocker arms 12 and 13 which are engaged by the low speed cams 17a and 17b abut the upper ends of the valve stems of a pair of intake valves 19a and 19b which are urged in closing direction by coil springs. Meanwhile, the third rocker arm 14 which is situated between the first and second rocker arms 12 and 13 and engaged by the high speed cam 18 is subjected to a normally upwardly biasing force by way of a lifter 21 provided in a part of the cylinder head 20 corresponding to the third rocker arm 14.

The interior of the mutually adjoining first through third rocker arms 12, 13 and 14 is provided with a selective coupling device 22 which consists of guide bores 23, 24 and 25 internally provided in the respective rocker arms 12, 13 and 14, and coupling pins 26, 27 and 28 slidably received in these guide bores 23, 24 and 25.

The first rocker arm 12 is provided with the first guide bore 23 which extends in parallel with the rocker shaft 11, and is open at its end facing the third rocker arm 14 but is closed at its other end, and the first coupling pin 26 is slidably received in the first guide bore 23. The closed end of the first guide bore 23 is communicated with an oil supply passage 31 provided inside the rocker shaft 11 via an oil passage 29 internally provided in the first rocker arm 12 and an oil supply hole 30 formed around the hollow rocker shaft 11.

The third rocker arm 14 is provided with the second guide bore 24 which extends in parallel with the rocker shaft 11 and has a same diameter as the first guide bore 23 in such a position that the second guide bore 23 is coaxial with the first guide bore 23 when a cam slipper of the third rocker arm 14 is at a stationary position located on a base circle of the high speed cam 18. The second coupling pin 27 having its one end abutting the first connecting pin 26 is slidably received in the second guide bore 24.

The second rocker arm 13 is likewise provided with a third guide bore 25 having a closed end, and a stopper pin 28 having its one end abutting the other end of the second coupling pin 27 is slidably received in the third guide bore 25. The stopper pin 28 is generally cylindrical in shape and is provided with a substantially closed end, and a return spring 32 interposed between the interior of the stopper pin 28 and the bottom end of the third guide bore 25 elastically urges the stopper pin 28 normally toward the third rocker arm 14.

Figure 2:
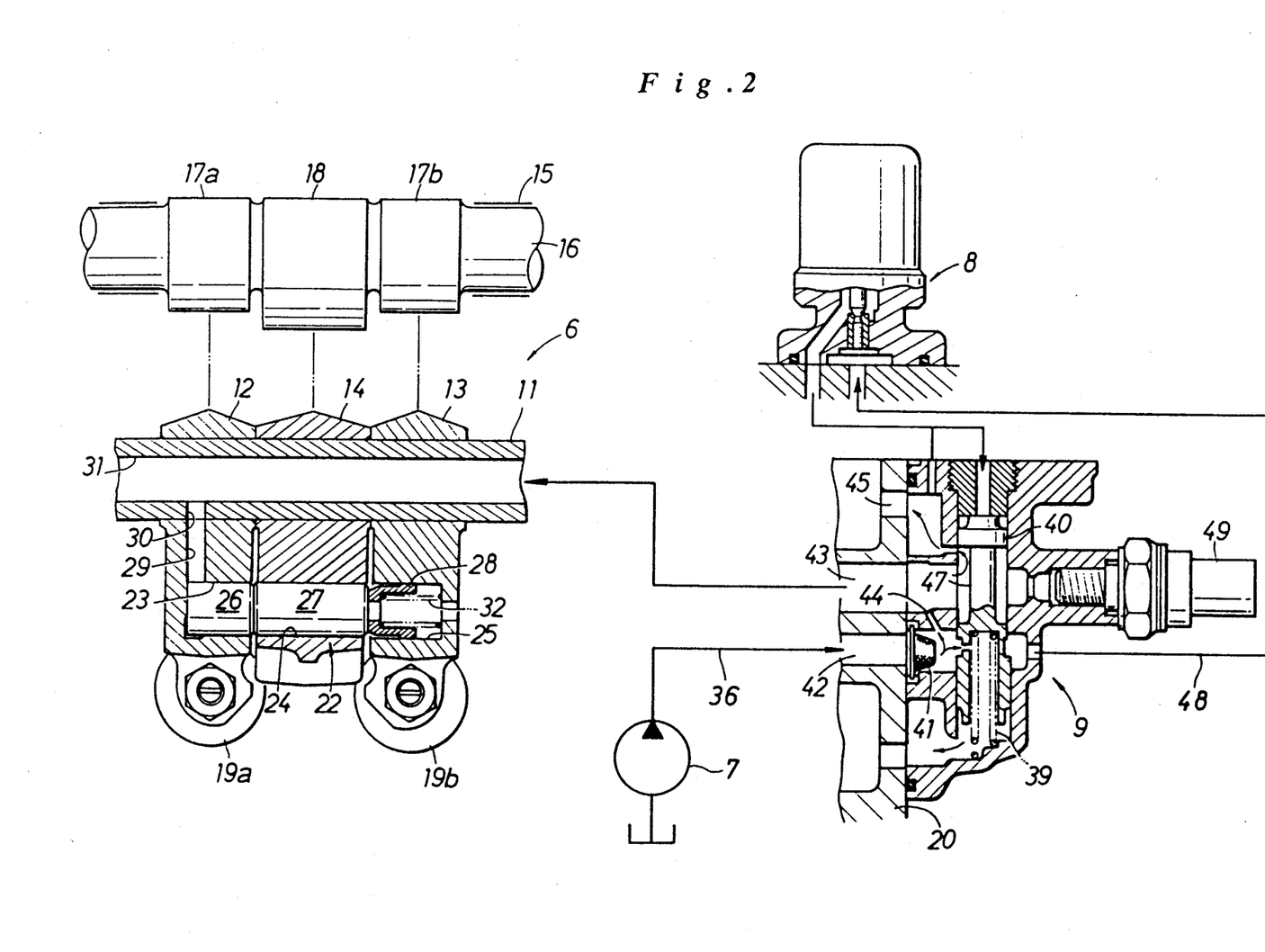
FIG. 2 is a sectional of a valve actuating device to which the present invention is applied.

By laterally moving the first and second coupling pins 26 and 27 as seen in FIG. 2 under the action of the oil pressure introduced to the left end of the first coupling pin 26 via the oil passage 29 and the biasing force of the return spring 32, it is possible to selectively switch over between a condition in which the rocker arms 12, 13 and 14 can be individually rotated as shown in FIG. 2 and a condition in which the rocker arms 12, 13 and 14 are integrally joined together by the coupling pins 26 and 27 each extending across two adjacent rocker arms so that the two intake valves 19a and 19b may be simultaneously actuated.

Meanwhile, the switch over control valve 9 is mounted on the cylinder head 20, and is internally provided with a valve spool 40 which is moved to its open position by oil pressure supplied from the solenoid valve 8 which is in turn controlled by a control signal supplied from the electronic control device 10 and urged toward its closed position by a return spring 39.

When the valve spool 40 is at its upper closed position (as shown in FIG. 2), an inlet port 42 leading to a lubrication oil passage 36 is communicated with an outlet port 43 leading to the oil supply passage 31 provided in the rocker shaft 11 solely through an orifice 44 via an oil filter 41. In this condition, a drain port 45 opening toward a space defined above the cylinder head is communicated with the outlet port 43, and the oil pressure in the oil supply passage 31 is low. Therefore, no oil pressure is supplied to the oil supply passage 31, and the coupling pins 26 and 27 are urged toward their respective positions for disengagement by the return spring 32 so that the rocker arms can be individually actuated by the respective cams, and can be moved individually.

When the spool valve 40 is switched over to a lower open position, the inlet port 42 is communicated with the outlet port 43 via an annular groove 47 of the valve spool 40, and the communication between the outlet port 43 and the drain port 45 is broken so that oil under pressure is supplied from the lubricating oil passage 36 to the oil supply passage 31. Once the actuation oil pressure is thereby supplied to the side of the first rocker arm 12, the first and second coupling pins 16 and 17 are fitted into the second and third guide bores 24 and 25 against the biasing force of the return spring 32, and all the rocker arms 12, 13 and 15 are integrally joined together.

The valve spool 40 is switched over to the open position against the biasing force of the return spring 39 by a pilot pressure supplied to the upper end of the valve spool 40 via a pilot oil passage 48 branched off from the inlet port 42. The aforementioned normally closed type solenoid valve 8 is interposed in this pilot oil passage 48, and when this solenoid valve 8 is opened by controlling the energization of the solenoid of the solenoid valve 8 with an output signal from an electronic control circuit 10, the valve spool 40 is switched over to its open position with the result that the actuation oil pressure is applied to the oil supply passage 31, and the opening of the solenoid valve 8 causes the valve spool 40 to be moved to its closed position with the result that the supply of oil pressure to the oil passage 31 is discontinued.

The switching movement of the valve spool 40 is confirmed by an oil pressure switch 49 which turns on in a low pressure condition and turns off in a high pressure condition by detecting the oil pressure at the outlet port 43 provided in the housing of the switch-over control valve 9.

According to this selective coupling device 22, when the oil pressure of the oil supply passage 31 is low, the first coupling pin 26, the second coupling pin 27 and the stopper pin 28 are located in the first guide bore 23, the second guide bore 24 and the third guide bore 25, respectively, under the biasing force of the return spring 32. In this condition, the rocker arms 12, 13 and 15 can move independently from each other. Therefore, while the central third rocker arm 14 undergoes a so-called lost-motion movement by repeatedly pushing down the lifter 51 by being actuated by the high speed cam 18, the first and second rocker arms 12 and 13 on either side thereof actuate the two intake valves 19a and 19b in the low speed mode by being actuated by the low speed cams 17a and 17b, respectively.

As the oil pressure of the oil supply passage 31 is increased, the first coupling pin 26 is moved into the second guide bore 24, and the second coupling pin 27 is moved into the third guide bore 25. Therefore, the three rocker arms 12, 13 and 14 are integrally coupled to each other. Since the cam profile of the high speed cam 18 is relatively larger than those of the low speed cams 17a and 17b, the first and second rocker arms 12 and 13 as well as the third rocker arm 14 are actuated by the high speed cam 18, and the two intake valves 19a and 19b are actuated in the high speed mode.

Figure 5:
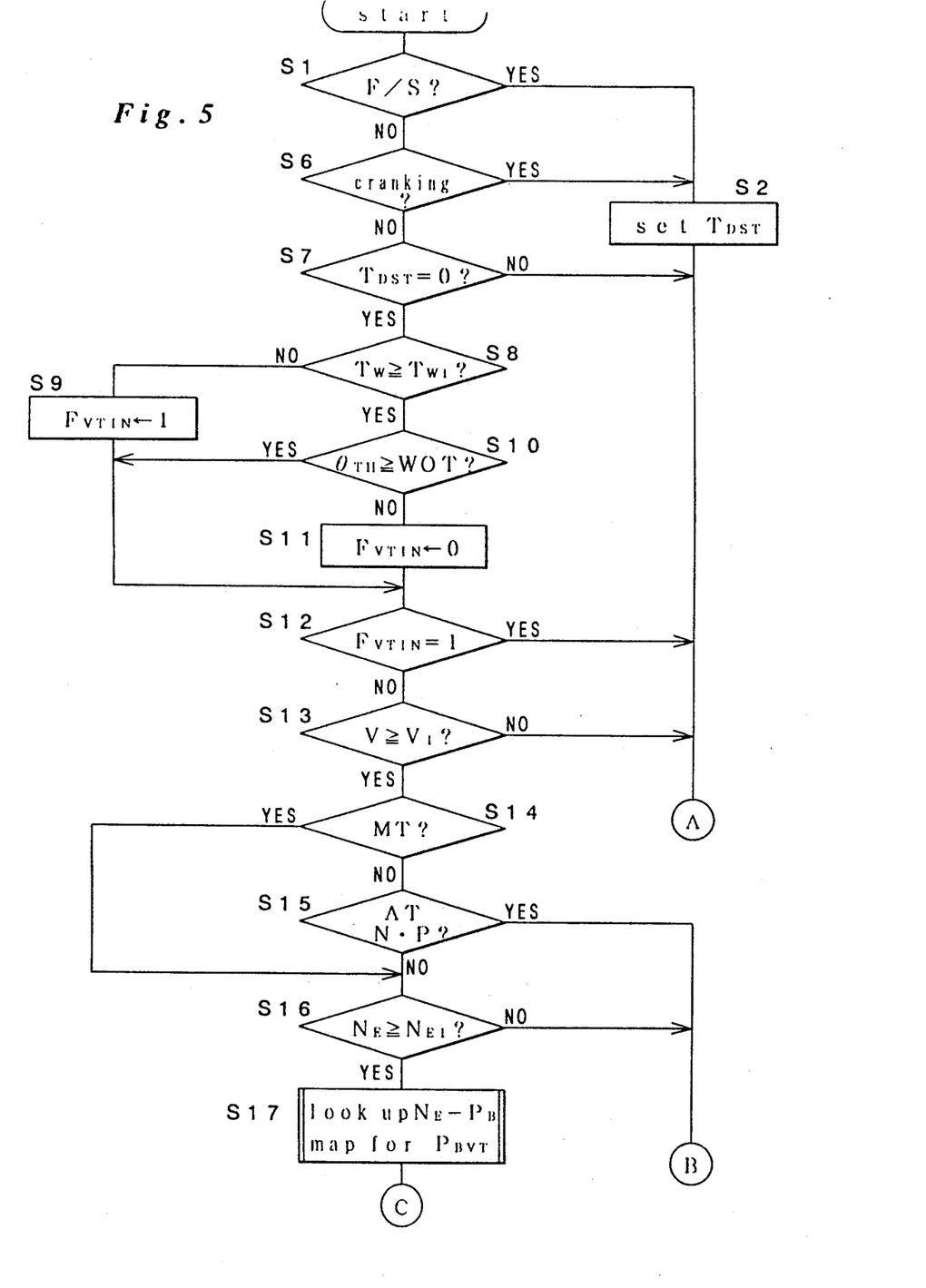
FIG. 5 is a first part of a flow chart showing the control operation of the system of the present invention.
Figure 6:
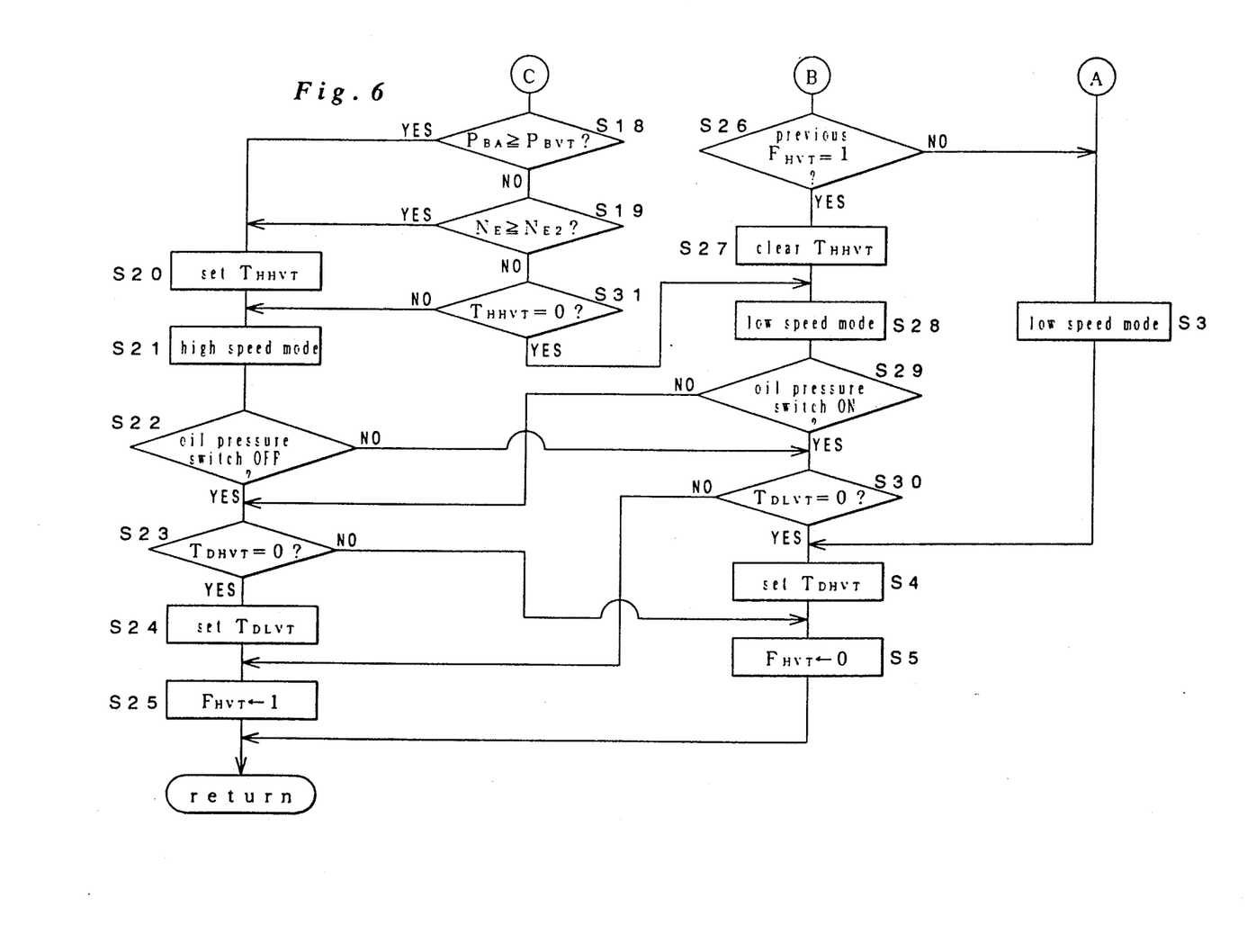
FIG. 6 is a second part of the flow chart showing the control operation of the system of the present invention.

Now the control program of the device of the present invention is described in the following with reference to FIGS. 5 and 6.

In step S1, it is determined whether the electronic control circuit 10 is receiving normal signals from various sensors, or it is determined whether a fail-safe action should be taken or not. If a fail-safe action is required to be taken, after setting a subtraction timer for measuring the elapsed time TDST (for instance, five seconds) from starting the engine in step S2, a low speed valve timing-/lift operation (referred to as "low speed mode" hereinafter) is selected, and a command signal to open the solenoid valve 8 is produced in step S3. Then, a subtraction timer is set to measure the elapsed time TDHVT (for instance, 0.1 seconds) from the switch over to a high speed vale timing/lift operation (referred to as "high speed mode" hereinafter) in step S4, and a flag FHVT to indicate non-selection of the high speed mode is set to 0 in step S5.

Meanwhile, if it is detected that no fail-safe action is being taken or that the vehicle is operating in a normal fashion in step S1, it is detected in step S6 if a start-off mode is being selected or, in other words, if the engine is being cranked or not. If the engine is being cranked, the program flow advances to step S3 via step S2, and the low speed mode is again selected.

If it is detected in step S6 that the engine is not being cranked or that the engine is already in an operative condition, the time remaining from the time elapsed after the engine start off TDST which was set in step S2 is evaluated in step S7. If TDST=0 or if more than five seconds has elapsed after the engine is started, it is determined in step S8 whether the current temperature of the cooling water Tw obtained as a representative temperature of the engine is higher than a prescribed temperature $Tw_1$ (which takes into account some hysteresis and may range, for instance, between 55° and 65° C.), or if the engine has been warmed up or not. If $Tw < Tw_1$ or if the engine has not been warmed up yet, a mode switch over prohibit flag FVTIN is set to 1 in step S9.

If it is determined that $Tw \geq Tw_1$, or that the engine has been warmed up in step S8, it is determined in step S10 if the current throttle opening angle $\theta TH$ is larger than WOT which is close to its fully open level, and if $\theta th < WOT$ or if the throttle opening level is below a prescribed level (light load), the mode switch over prohibit flag FVTIN is set to 0 in step S11.

If it is determined in step S10 that $\theta TH \geq WOT$ or that the throttle opening angle is large (heavy load), the mode switch over prohibit flag FVTIN is checked in the next step S12. If the mode switch over prohibit flag FVTIN is not 1 or if the mode switch over is possible, it is determined in step S13 if the current vehicle speed V is higher than a prescribed vehicle speed $V_1$ (which takes into account some hysteresis and may range, for instance, between 8 and 5 km/h) which is set at an extremely low level. If $V < V_1$ or if the vehicle speed has not reached the prescribed vehicle speed, or, as a second possible situation, when it is determined in step S7 that TDST is not equal to 0 or that the timer is running as well as when it is determined in step S12 that the mode switch over prohibit flag FVTIN=1 or that the mode switch over is being prohibited, the program flow advances to step S3, and the low speed mode is selected.

In short, the low speed mode is unconditionally selected when a fail-safe action is being taken, before the engine is started, when the engine is being cranked, immediately after the engine is started, before the engine has been warmed up, and when the vehicle is stationary or moving at an extremely low speed. It is based on the consideration to avoid problems arising from the instability of oil pressure immediately after the engine is started, possible unsatisfactory operation of the selective coupling device due to the viscosity of the lubricating oil before the engine is warmed up, and the occurrence of irregular combustion. Also when a high load condition is imposed before the engine has been warmed up, even when the operating condition of the engine is, by itself, suitable for the high speed mode, the switch over to the high speed mode is prohibited, and the low speed mode is continued even when the engine is warmed up as long as this condition is persisting unless the throttle valve is returned to its neutral condition. It is designed so because a relatively strong shock may be produced against the intention of the operator of the vehicle if the valve actuation mode is suddenly switched over when the opening of the throttle valve is large.

If it is determined in step S13 that $V \geq V_1$ or that the vehicle speed has reached the prescribed vehicle speed, it is determined if the vehicle is equipped with a manual transmission MT or not. If not or if the vehicle is equipped with an automatic transmission AT, it is determined in step S15 if the shift position is either parking P or neutral N. If the shift position is neither P nor N, the program flow advances to step S16. Also if it is determined that the vehicle is equipped with a manual transmission MT in step S14, the program flow advances to step S16. In step S16, the current rotational speed of the engine NE is compared with a lower limit rotational speed $NE_1$ (which takes into account some hysteresis and may range, for instance, between 4,800 and 4,600 rpm) below which the low speed mode always produces a higher output than the high speed mode. If $NE \geq NE_1$ or if either mode is possible, the mode selection map is looked up in step S17, and an intake negative pressure PBVT suitable for a mode switch over for the current rotational speed of the engine is obtained.

In step S18, the current intake negative pressure PBA is compared with the intake negative pressure at the mode switch over point PBVT. If PBA < PBVT or the load is lower than a prescribed level, the current engine rotational speed NE is compared in step S19 with the upper limit of the engine rotational speed $NE_2$ (which may include hysteresis and may range between 5,900 and 5,700 rpm) which gives a range in which the high speed mode always offers a higher output. Either if $NE \geq NE_2$ or if it is determined in step S18 that $PBA \geq PBVT$ or a high load condition or a high speed condition exceeding a prescribed level is in existence, the subtraction timer THHVT is set so as to maintain the high speed mode for a prescribed time period in step S20, and the high speed mode is selected in step S21 by supplying a valve open control signal to the solenoid valve 8. The timer THHVT gives some hysteresis to the point of transition from the high speed mode to the low speed mode so that the frequency of the activation of the coupling switch over device 22 may be reduced, and the occurrence of hunting may be avoided.

In step S22 the output signal from the oil pressure switch 49 is evaluated for the purpose of monitoring the operation of the switch over control valve 9. If the oil pressure switch 49 is off or it is determined that oil pressure is being applied to the coupling switch over control device 22, the time remaining from the delay time TDHVT which was set up in step S4 following the activation of the coupling switch over control device is evaluated in step S23. If TDHVT=0 or it is determined that the delay time is finished, the subtraction timer is set up in step S24 for measuring the time period elapsed after the onset of the current low speed mode. In step S25, the flag FHVT for indicating the presence of the high speed mode is set to 1.

Meanwhile, if P or N range is detected in step S15, or if it is determined that $NE < NE_1$ in step S16, it is determined from the flag FHVT if the high speed mode was selected in the previous cycle in step S26. If FHVT is not equal to 1 or the high speed mode was not selected in the previous cycle, the program flow advances to step S3 wherein the low speed mode is selected. If FHVT=1 or the high speed mode was selected in the previous cycle (it means that the vehicle is decelerating), the timer THHVT for maintaining the high speed mode for a certain time period is cleared in step S27, and the low speed mode is selected in step S28.

Thereafter, the output signal from the oil pressure switch 49 is evaluated in step S29. If it is determined that the oil pressure switch 49 is on or that no oil pressure is acting upon the coupling switch over device 22, the time remaining from TDLVT which was set up in step S24 is read in step S30, and the program flow advances to step S4 if TDLVT=0.

On the other hand, if it is determined that $NE < NE_2$ in step S19, the time remaining from the THHVT timer which was set up in step S20 is evaluated in step S31. If THHVT=0, the low speed mode is selected in step S28. Otherwise the program flow advances to step S21 wherein the high speed mode is selected.

According to this control flow, the high speed mode is selected when the engine rotational speed NE is higher than a prescribed value and the high speed mode would give rise to a higher engine output. Even when the engine rotational speed NE is high, if the vehicle is stationary or, even when it is running, is running at a low speed with a low engine rotational speed, and the vehicle has not reached a high speed condition, the low speed mode is selected. Likewise, the low speed mode is selected if the engine rotational speed is low, the low speed mode would give rise to a higher engine output, and the time period for retaining the high speed mode THHVT is zero. Further, when the high speed mode is taken over by the low speed mode, the high speed mode is continued for the prescribed time period THHVT.

When the oil pressure switch 49 is on or it is determined that the switch over oil pressure is low in step S22, the program flow advances to step S30. If the oil pressure switch 49 is determined to be off in step S22 and TDHVT is determined to be not equal to 1 in step S23, the program flow returns to step S5. On the other hand, if the oil pressure switch 49 is off or it is determined that the switch over oil pressure is high in step S29, the program flow advances to step S23. If the oil pressure switch 49 is determined to be on in step S29 and TDLVT is determined to be not equal to 0 steps S30, the program flow advances to step S25.

In this manner, if the output signal from the oil pressure switch 49 is not off in step S22 in spite of the switch over from the low speed mode to the high speed mode, the program flow advances to step S30, and the low speed mode is maintained until the output signal from the oil pressure switch 49 becomes off. Conversely, if the output signal from the oil pressure switch 49 is not on in step S29 in spite of the switch over from the high speed mode to the low speed mode, the program flow advances to step S23, and the high speed mode is maintained until the output signal from the oil pressure switch 49 becomes off.

The time periods TDHVT and TDLVT set up on the two switch over delay timers in steps S4 and S24, respectively, are determined according to the response time required for the movement of the spool valve 40 of the switch over control valve 9 resulting from the activation of the solenoid valve 8 and the completion of the switch over movements of the coupling pins in all of the cylinders accomplished by the resulting change in the oil pressure in the oil supply passage 31. After the start of the switch over action is detected from the signal from the oil pressure switch 49, it is not judged that the valve timing has been changed over in all of the cylinders until TDLVT=0 in the case of transition from the high speed mode to the low speed mode and TDHVT=0 in the case of transition from the low speed mode to the high speed mode, and the operating conditions existing before the valve timing switch over command are maintained.

If it is determined in step S26 that the high speed mode was not selected in the previous control cycle, or, in other words, if the vehicle has just been started off or the vehicle is being accelerated, the low speed mode is selected without checking the signal from the oil pressure switch so as to avoid the inconveniences in case the oil pressure switch 49 becomes faulty, and its output remains in the off condition.

Thus, according to the present invention, in a control program which employs a signal output related to the change in the dynamic operating conditions of an engine such as a rotational speed of the engine, and an output signal related to a temperature of the engine such as the cooling water temperature and the temperature of the lubricating oil as the conditions for switching over the valve actuation modes, the execution of the switch over from the low speed mode to the high speed mode is prohibited when a high load condition is detected immediately after the first detection of the warming up of the engine by obtaining an output signal related to an opening angle of a throttle valve or an intake negative pressure so that the vehicle operator may not experience a noticeable shock due to a sudden change in the engine output. Therefore, the present invention can significantly contribute to the improvement of the driveability of a vehicle equipped with an engine incorporated with a variable valve actuation property control device.

Figure 7:
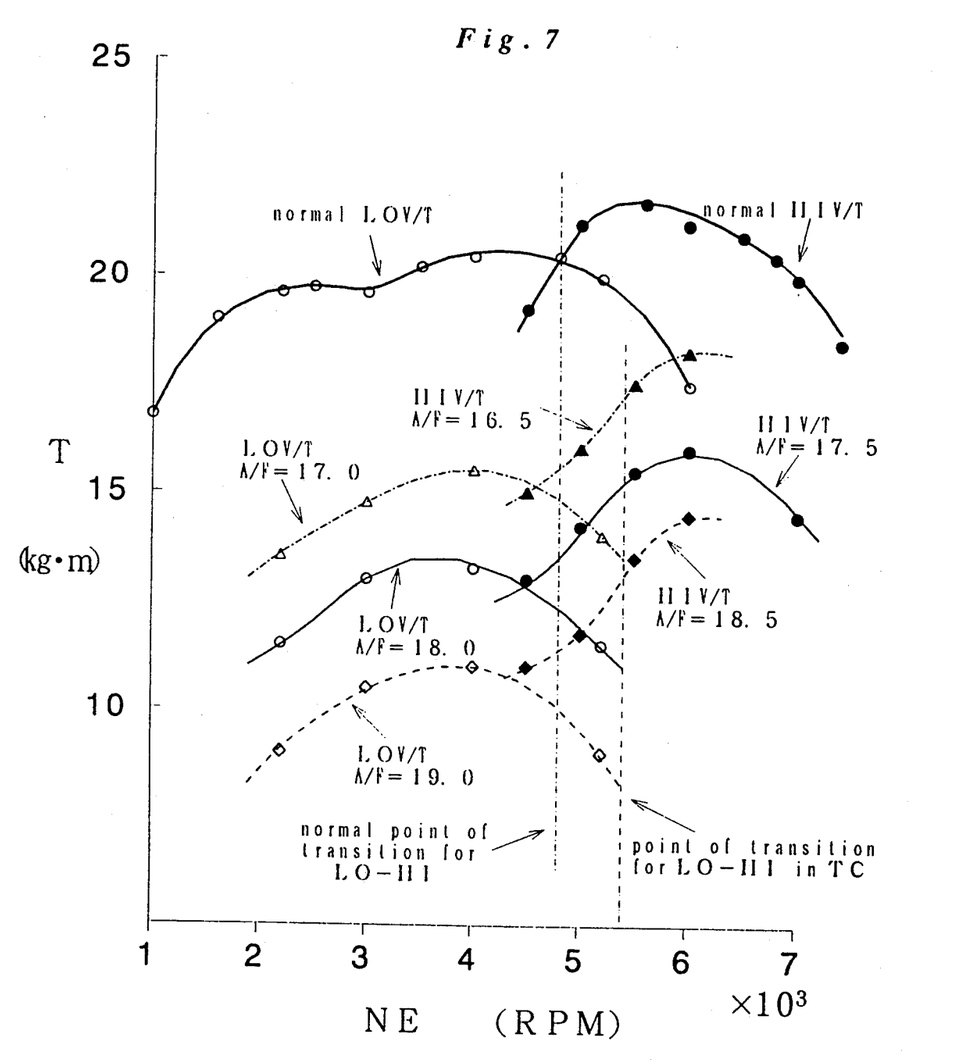
FIG. 7 is a graph showing the output property of the engine to which the present invention is applied.

FIG. 7 is a graph showing the relationship between the output torque T and the rotational speed NE of the engine to which the present invention is applied. The property curves for the normal air/fuel ratio in the range of 12,0 to 13,0 are indicated in bold lines in an upper part of the graph, and the property curves during the execution of the traction control are indicated by thinner lines. In particular, during the execution of the traction control, the air/fuel ratio is changed over at the same time as effecting the transition from one valve actuation mode to another during the execution of the traction control. Basically, the air/fuel ratio for the low speed mode (LO V/T) is set at 18.0 while the air/fuel ratio for the high speed mode (HI V/T) is set at 17.5 when the traction control is being executed.

When the traction control is being executed, the engine output torque is reduced from the normal level so as to prevent the slipping of the driven wheels by making the air/fuel ratio leaner than the normal levels mentioned above.

Suppose that the setting of the air/fuel ratio in the low speed mode was shifted toward the richer side (for instance the air/fuel ratio is 17.0 as indicated by the chain-dot lines in FIG. 1), and the setting of the air/fuel ratio in the high speed mode was shifted toward the leaner side (for instance the air/fuel ratio is 18.5 as indicated by the broken lines in FIG. 1) due to manufacturing errors or control errors. In such a case, transition of the valve actuation mode from the low speed mode to the high speed mode would cause a sharp drop in the output torque of the engine. Such a drop in the output torque due to the change in the valve actuation mode would reduce the slip ratio, which in turn would terminate the traction control and restore the setting of the air/fuel ratio back to the normal level. Further, this would result in the increase in the output torque of the engine, which would increase the slip ratio of the driven wheels again, and would cause the resumption of the traction control. In this manner, the control system may develop a condition of hunting, thereby preventing a satisfactory operation of the traction control and a smooth operation of the vehicle.

In view of this possibility, according to the present invention, the switching point for the transition from the low speed mode to the high speed mode under the condition of the traction control is shifted more toward the high speed and high load side than the normal setting so that a sharp reduction in the output torque may not be caused even in the worst condition.

Figure 8:
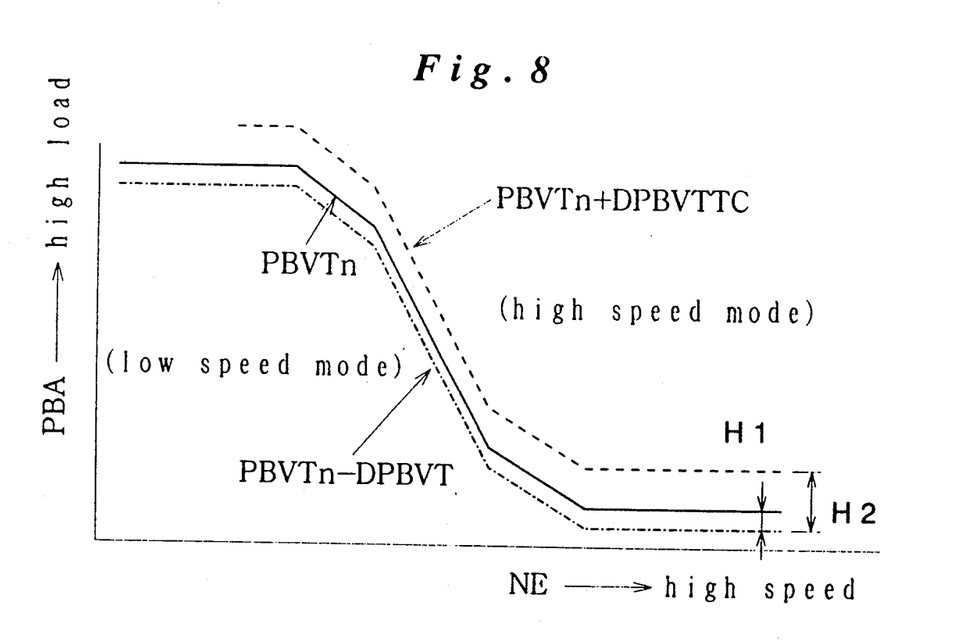
FIG. 8 is a graph showing the principle of switching over between the different valve actuation modes.
Figure 9:
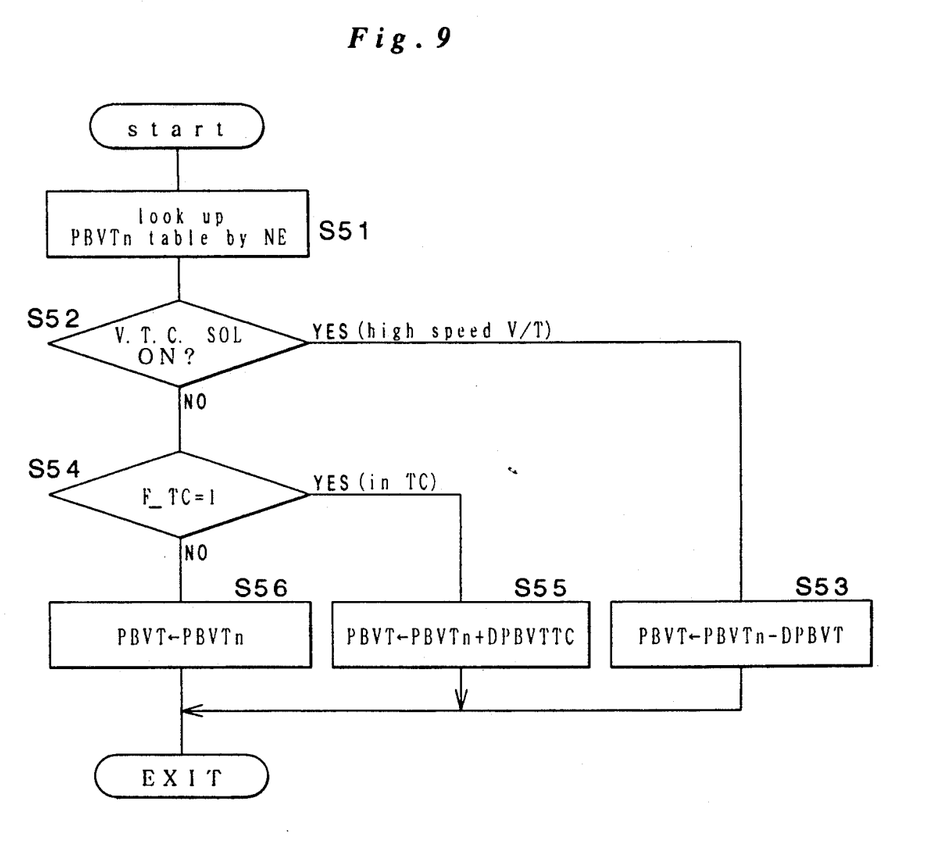
FIG. 9 is a flow chart showing a part of the control process according to the present invention.
Figure 10:
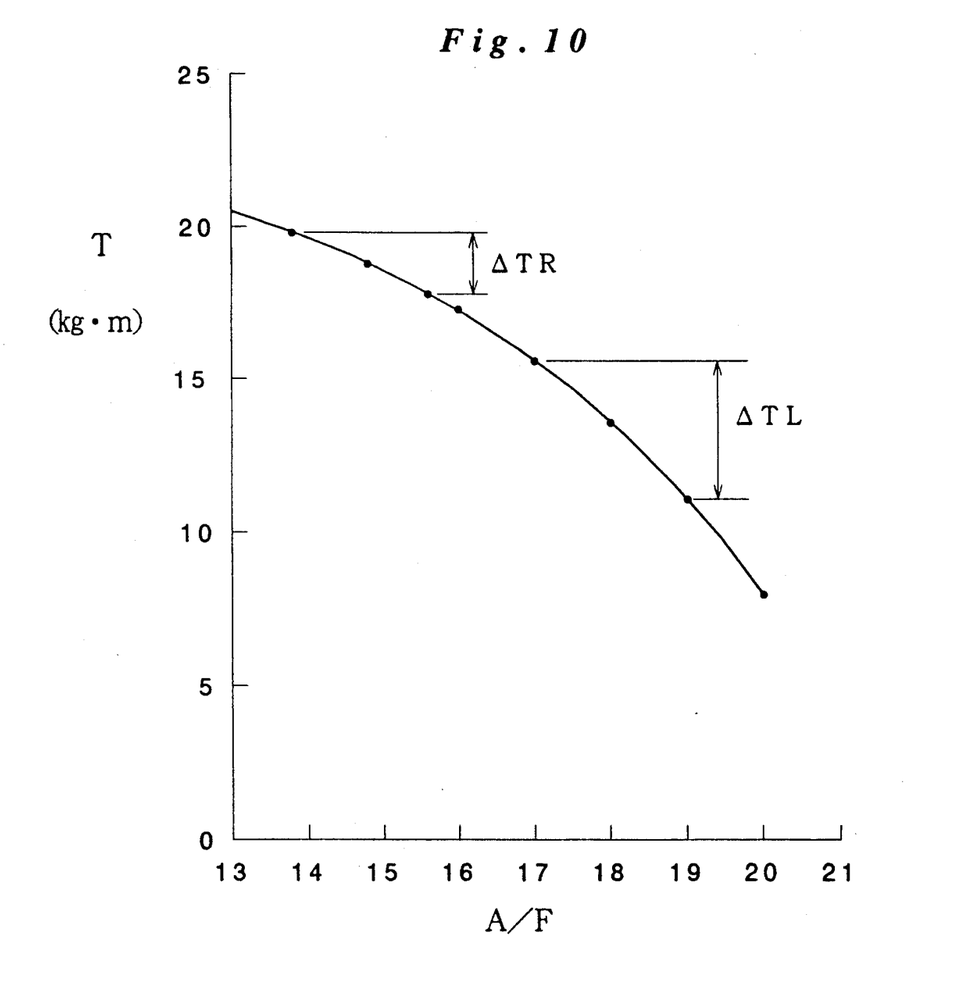
FIG. 10 is a graph showing the relationship between air/fuel ratio and output torque.

FIG. 8 is a graph corresponding to look up tables of the control system (which are mentioned hereinafter) for illustrating the principle for determining the point of transition between the low speed mode and the high speed mode according to the absolute value of the intake negative pressure PBA and the rotational speed of the engine NE. FIG. 9 shows the control flow for shifting this transition point.

In step S51, a table listing the values of the intake negative pressure for mode switch over PBVTN for different rotational speeds of the engine NE is looked up, and it is determined if the high speed mode or the low speed mode is currently being selected in step S52.

If the high speed mode is being selected in step S52, a special map PBVTN−DPBVT is set up exclusively for the transition from the high speed mode to the low speed mode as a map for the switch over of the valve actuation mode in step S53.

If the low speed mode is being selected in step S52, it is determined in step S54 if the traction control is being executed or not. If the traction control is detected in step S54, a map PBVTN+DPBVTTC is set up as a map for giving the point of transition from the low speed mode to the high speed mode in which the point of transition is shifted more toward the high speed and high load condition than the normal setting.

If the traction control is not detected in step S54, a normal map PBVTN is set up as a map for giving the point of transition from the low speed mode to the high speed mode.

Under normal condition, the transition from the low speed mode to the high speed mode is carried out according to the normal map PBVTN while the transition from the high speed mode to the low speed mode is carried out according to a different map PBVTN−DPBVT. There is some difference H1 between these two maps as shown in FIG. 8, and the gap H1 between the two curves in the graph of FIG. 8 makes up a hysteresis which prevents frequent switchovers in the valve actuation mode.

When the traction control is being executed, yet another map PBVTN+DPBVTTC is employed for giving the point of transition from the low speed mode to the high speed mode so that the transition may occur when the rotational speed of the engine is higher than the normal level for the transition or when the absolute value of the intake negative pressure is greater than the normal level for the transition. As a result, the gap H2 of hysteresis for the transition between the high speed mode and the low speed mode is made broader so that the occurrence of hunting during the traction control is effectively prevented.

The rotational speed of the engine and the intake negative pressure has a certain correlation, and it is possible to shift the point of transition by shifting the threshold of the rotational speed of the engine while the threshold level of the intake negative pressure is kept fixed. Alternatively, the point of transition may be shifted by shifting the threshold of the intake negative pressure while the threshold level of the rotational speed of the engine is kept fixed.

Alternatively, it is also possible to set the air/fuel ratio slightly leaner than actually required by taking into account possible control errors without changing the map for valve actuation mode switch over. For instance, when the standard air/fuel ratio for the high speed mode is set at 16.5, a sharp drop in the output torque upon transition from the low speed mode to the high speed mode can be avoided, and the occurrence of hunting may be prevented even when the air/fuel ratio in the low speed mode is somewhat richer than initially designed, and the air/fuel ratio in the high speed mode is somewhat leaner than initially designed.

If the air/fuel ratio deviates towards the leaner side in the low speed mode and towards the richer side in the high speed mode, the change in the output torque resulting from the mode switch over likewise occurs. However, such deviations are in any case within the combustion limit range of the air/fuel ratio, and therefore would not cause any substantial interference to the stability of the traction control.

Thus, according to this aspect of the present invention, it is possible to avoid the problems which could arise when the above mentioned traction control is applied to an engine equipped with a valve actuation mode switch over control device, and to avoid a sharp change in the output torque of the engine. Thus, a favorable traction control can be accomplished without creating any undesirable problems in an engine equipped with a valve actuation switch over control device.

Although the present invention has been described in terms of specific embodiments, it is possible to modify and alter details thereof without departing from the spirit of the present invention.

What we claim is:

1. A variable valve actuation control system, comprising:
    a first detecting means for detecting at least a load condition of an engine;
    second detecting means for detecting a representative temperature of the engine; and
    control means for switching over an operating condition of a valve actuating mechanism for at least one of an intake valve and an exhaust valve of the engine from a low speed mode suitable for a low speed range of the engine to a high speed mode suitable for a high speed range of the engine when said first detecting means has detected a load higher than a first prescribed load level and said second detecting means has detected a temperature higher than a prescribed temperature level;
    further comprising;
    means for restricting transition from said low speed mode to said high speed mode when said second detecting means has detected a temperature exceeding said prescribed temperature level while said first detecting means has detected a load exceeding a second prescribed load level which is higher than said first prescribed load level.

2. A control system according to claim 1, wherein said restricting means cancels said restriction when a load detected by said first detecting means which once has been higher than said second prescribed load level has been lowered below said second prescribed load level while said second detecting means is detecting a temperature higher than said prescribed temperature level.

3. A control system according to claim 1, wherein said representative temperature of the engine consists of a cooling water temperature of the engine.

4. A control system according to claim 1, wherein a restricting action of said restricting means consist of retaining said low speed mode.

5. A control system according to claim 1, wherein said load condition of the engine detected by said first detecting means consists of a substantially wide open throttle condition of the engine.

6. A control system according to claim 1 wherein said prescribed level of said representative temperature of the engine is a level corresponding to a warmed up condition of the engine.

7. A variable valve actuation control system, comprising:

first detecting means for detecting at least a load condition of an engine;

second detecting means for detecting a rotational speed of the engine; and third detecting means for detecting a representative temperature of the engine; and control means for switching over an operating condition of a valve actuating mechanism for at least one of an intake valve and an exhaust valve of the engine from a low speed mode suitable for a low speed range of the engine to a high speed mode suitable for a high speed range of the engine when said first detecting means has detected a load higher than a first prescribed load level, said second detecting means has detected a rotational speed higher than a prescribed rotational speed level, and said third detecting means has detected a temperature higher than a prescribed temperature level;

further comprising:

means for restricting transition from said low speed mode to said high speed mode when said third detecting means has detected a temperature exceeding said prescribed temperature level while said first detecting means has detected a load exceeding a second prescribed load level which is higher than said first prescribed load level, and said second detecting means has detected a rotational speed higher than said prescribed rotational speed level.

* * * * *